June 23, 1953  I. SPIESS ET AL  2,642,794
ELECTRIC FRANKFURTER COOKER
Filed March 2, 1949  2 Sheets-Sheet 1

*INVENTORS*
IRWIN SPIESS and
LEONARD B. SIMON
BY
Mock & Blum
ATTORNEYS.

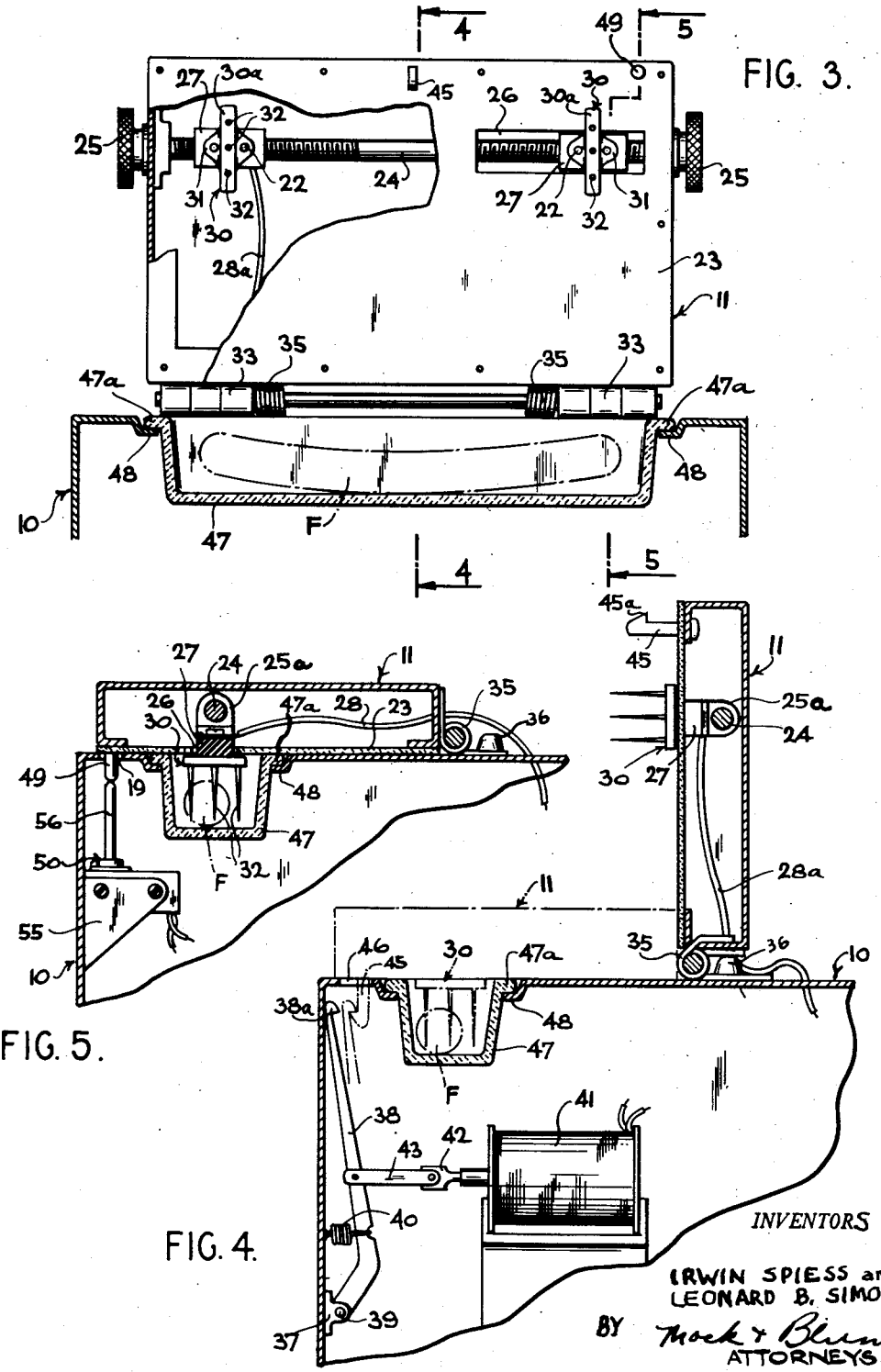

Patented June 23, 1953

2,642,794

UNITED STATES PATENT OFFICE 2,642,794

ELECTRIC FRANKFURTER COOKER

Irwin Spiess and Leonard B. Simon,
New York, N. Y.

Application March 2, 1949, Serial No. 79,224

8 Claims. (Cl. 99—358)

This invention relates to a device for cooking foods by passing an electric current therethrough. The device is particularly adapted to the cooking of frankfurters and other foods whose electrical resistances decrease when they are cooked by the passage of current therethrough, and which may be readily impaled upon electrodes and hold their shape when subjected to such handling.

Because of the considerable length of time required to grill frankfurters by ordinary means, commercial establishments with a small volume of business in this commodity have found it necessary to cook frankfurters in advance of requests for same. These frankfurters, therefore, have frequently had to remain in a cooked condition for a considerable period of time before consumption, with resulting deterioration in quality and taste. Such establishments have had a need for a frankfurter cooker which would cook frankfurters rapidly and with a minimum of attention by the operator.

Large-scale purveyors of grilled frankfurters, together with private homes, also have a need for a device which will cook frankfurters quickly and with a minimum of attention by the operator.

It is an object of this invention to provide a device for cooking frankfurters, which may be easily placed in operation, which will cook frankfurters very rapidly, and which will cease operation automatically.

The improved electric frankfurter cooker may be placed in operation by merely inserting a frankfurter in the device and closing a cover, which is normally held in an open position by spring means. This simultaneously connects the frankfurter into an electric circuit and closes said circuit. Automatic means are provided for holding the cover closed while the frankfurter is cooked by the passage of current therethrough. When the frankfurter is sufficiently cooked, the device automatically ceases operation, the covers spring open, and the frankfurter is in a convenient position for ready removal.

The improved electric frankfurter cooker may be readily adjusted to accommodate different sizes of frankfurters, and may be readily pre-set to cook frankfurters of varying characteristics to the desired extent, from "rare" to "splitting."

A further object of this invention is to provide a frankfurter cooker, such as the above, which will be safe to operate, the electric circuit being broken when the cover is in open position, and which will also be simple to operate and easy to keep clean.

A further object of this invention is to provide a frankfurter cooker, such as the above, which may be adapted to cook a plurality of frankfurters simultaneously.

Other objects and advantages of this invention will become apparent in the following description and the annexed drawings, in which preferred embodiments of the invention are disclosed.

Figure 1:
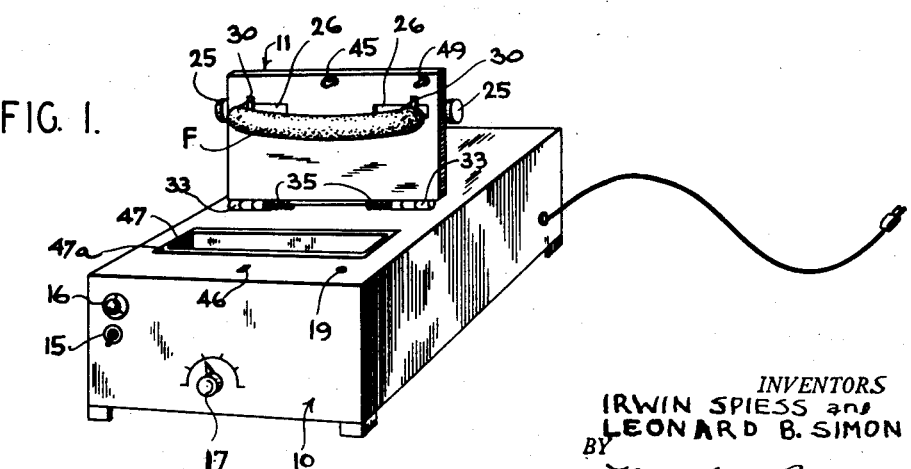
Fig. 1 is a perspective view of the device with the cover open and a frankfurter impaled on the electrodes.

Fig. 3 is an enlarged vertical section through Fig. 1. The box in which the device is housed is broken away, with only the glass tray in which the frankfurter rests being shown. The cover is shown in raised position, partly broken away and partly in section;

Fig. 4 is a fragmentary section along line 4—4 of Fig. 3, showing the cover in raised position. The dash lines show the position of the cover when it is closed; and Fig. 5 is a fragmentary section along line 5—5 of Fig. 3, showing the cover in closed position.

Referring to the drawings in detail, it will be discerned from Fig. 1 that most of the parts of the device are housed in a substantially rectangular box or casing 10. Box 10 has a cover 11, in which the remaining parts are located.

Figure 2:
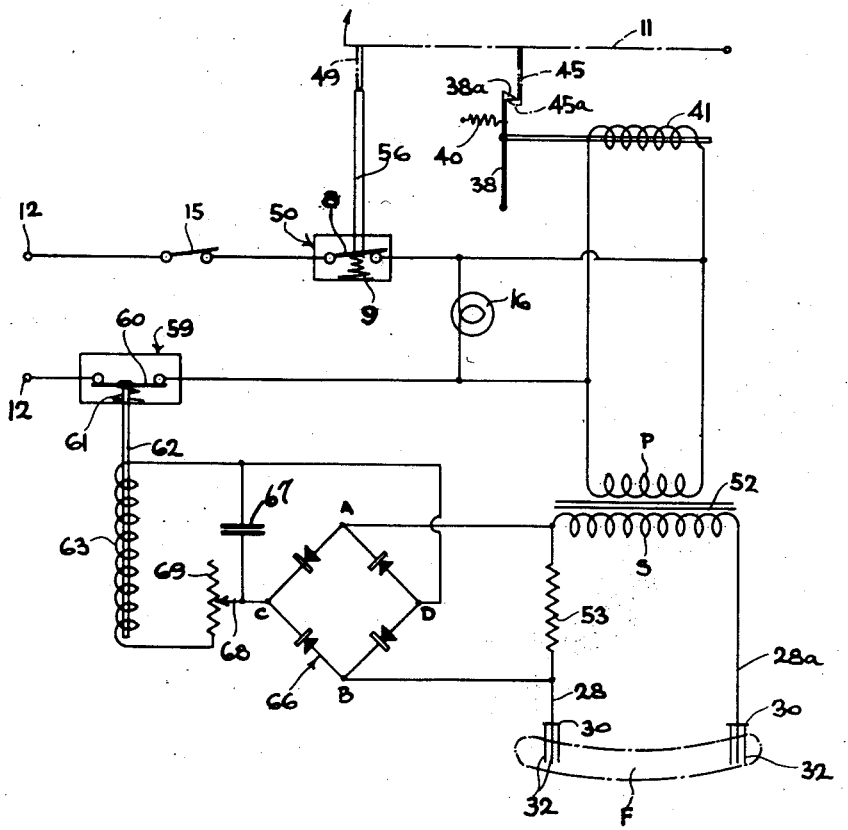
Fig. 2 is a schematic diagram of the electric circuit employed in the device.

Fig. 2 illustrates a circuit embodying the main features of the invention. Figs. 3, 4 and 5 show details of some of the parts shown schematically in Fig. 2. Certain of the parts shown in Fig. 2, which are conventional in design, are not shown in the detailed views of Figs. 3, 4 and 5.

Fig. 2 shows that the device has a series primary circuit, comprising a source of alternating current which may be connected to terminals 12, 12; a manual "on" and "off" switch 15; a microswitch 50, which is regulated by the closing and opening of cover 11; primary P of transformer 52; and a relay switch 59, which is normally closed and may be opened by means actuated by the operation of the secondary circuit. Pilot lamp 16 and lock solenoid 41 are respectively connected in parallel with said primary P. Said solenoid 41 controls cover latching means 38a, 45a.

Pilot lamp 16 is mounted outside box 10 and serves as an indicator that the device is in operation. Optionally, said lamp may be omitted. This is also true of switch 15, since switch 50 is a manual switch. However, once switch 50 is closed, it is not normally opened till cooking of the frankfurter is completed, and switch 15 serves as an emergency means to stop operation of the device prior to the time set by the automatic controls.

As is clearly shown in Fig. 5, switch 50 comprises a post 56 which is mounted vertically on bracket 55. Said bracket is secured to the inner face of the front wall of box 10. The base of post 56 bears against contact member 8, which is biased toward open position by spring 9.

Post 49 is secured to bottom plate 23 of cover 11. When said cover is closed, said post 49 passes through hole or recess 19 in the top of box 10, and strikes against post 56. Said post 56 is thereby depressed against the biasing action of spring 9, bringing member 8 into closed position. Switch 50 is thus closed, completing the primary circuit.

As is clearly shown in Fig. 4, solenoid 41, when energized, operates plunger 42, which is pivotally connected by connecting link 43 to rod member 38. Said rod 38 is pivotally attached by pivot pin 39 to bracket 37, which is mounted on the inner face of the front wall of box 10. Rod 38 is biased toward said front wall by means of spring 40. Rod 38 has a head 38a, which serves as a latch member.

The other latch member 45a, is the head of rod member 45, which is secured to bottom plate 23 of cover 11. When cover 11 is closed, said member 45a passes through hole or recess 46 in the top of box 10 and assumes the dotted line position of Fig. 4. Simultaneously, solenoid 41 is energized, said plunger 42 is pulled away from the front wall of box 10. As a result, latch member 38a is pulled into the dotted line position of Fig. 4, in which position said member 38a engages member 45a. Cover 11 is thereby prevented from springing open.

The secondary circuit of the device comprises secondary S of transformer 52, frankfurter F and resistor 53, all connected in series. Said resistor 53 is also connected across the input terminals A, B of rectifier 66. The output terminals C, D of said rectifier are connected in series with variable resistor of rheostat 69 and relay solenoid 63. Filter condenser 67 is connected across said terminals C and D, to ensure that the direct current output has no alternating current component therein. When sufficient current passes through said solenoid 63, it actuates means to open switch 59.

Said secondary circuit is completed when frankfurter F is impaled on electrodes 30, which are located underneath cover 11.

Cover 11 is box-like in shape, with an inner cavity, and is preferably formed from two members. One member comprises the top wall, side walls and front and rear walls. A bottom plate member 23 is provided, which is preferably made of plastic, glass or other suitable insulating material.

Shaft 24 is located in the interior of cover 11, and extends outside the side walls thereof through suitable bearings. Turning knobs 25 are mounted on the ends of shaft 24, externally to cover 11. The two halves of shaft 24 are oppositely threaded. Threaded collars 25a are respectively mounted on the respective halves of shaft 24. Depending on the direction in which knobs 25 are turned, collars 25a may be caused to move toward or away from each other.

Spacing blocks 27, which are made of any suitable insulating material, are respectively secured to collars 25a and protrude through respective slots or recesses 26 in cover plate 23. Slots 26 are respectively alined in the direction of travel of collars 25a. The extremities of slots 26 serve as end-stops to limit the axial movement of collars 25a. Blocks 27 are longer than collars 25a.

Each electrode 30 comprises a narrow plate 30a with a pair of ears or flanges 31. Each electrode 30 is secured to a respective block 27, by means of screws 22 passing through said block and said flanges 31. Each plate 30a lies across a slot 26, and is provided with spaced upstanding sharp pins 32 on which frankfurters of varying diameters may be impaled.

Leads 28 and 28a are respectively connected to one of the screws 22 passing through respective blocks 27, and are thereby respectively connected to respective electrodes 30. Said leads are respectively brought through cover 11 into box 10. Lead 28a is connected to one terminal of secondary S of transformer 52, and lead 28 is secured to one terminal of resistor 53. Therefore, the impaling of frankfurter F on electrodes 30 completes the secondary circuit.

Cover 11 is conventionally secured to box 10 by means of hinges 33 and is normally held in open position by tension springs 35. Studs such as 36 may be secured to the top of box 10 to serve as seats for the rear wall member of cover 11, so that said cover is normally held in a vertical position.

When cover 11 is moved to closed position, electrodes 30 and associated pins 32 pass through a recess formed in the top of box 10. Said recess is adapted to hold a removable glass tray 47, said tray having a peripheral flange 47a which rests over depressed peripheral flange 48, which is formed in the top wall of box 10 around recess 20. The top of tray 47 is flush with the top of box 10.

Tray 47 is dimensioned so as to hold electrodes 30 with a small amount of clearance beneath and on each side of each of said electrodes. Tray 47 is of sufficient length to accommodate electrodes 30 when they are spaced the maximum distance apart.

While frankfurter F may be directly impaled on electrodes 30, it is preferable first to place said frankfurter in tray 47. Then when cover 11 is closed, electrodes 30 penetrate frankfurter F, and it is suitably impaled, completing the secondary circuit.

The values of the components of said secondary circuit are not critical, the chief requirement being that relay switch 59 be sufficiently sensitive; i. e., that said switch be opened by a certain value of current, with a small margin of error, in relay solenoid 63. Such relays are more sensitive when operated on direct current, and it is for this reason that rectifier 66 is used.

The following values of the components of the secondary circuit are, therefore, to be taken as illustrative only. As one example, transformer 52 operated on 110 volts, and gave an output of 245 volts. Resistor 53 was 6 ohms, 100 watts. Rectifier 66 was of the full-wave, dry disk type. It took a maximum alternating current input, across terminals, A, B, of 100–120 ma., 12 volts; and it had a maximum direct current output, across terminals C, D of 100 ma., 10 volts. Filter condenser 67, which may be placed across terminals C, D, was given a value of 500 microfarads. Solenoid 63 was about 45 ohms and 2400 turns, and was operative at about 170 ampere turns to open switch 59.

Rheostat 69 was about 100 ohms. Since terminal D is connected to moving arm 68 of said rheostat, the amount of resistance in the control circuit of solenoid 63 may be varied by moving said arm 68. This is done by means of knob 17, which is mounted on the outside of box 10.

Solenoid 63 has a movable core, which is connected to rod 62, which is in turn secured to contact member 60 of switch 59. Said contact member is normally biased to closed position by means of spring 61. When sufficient current passes through solenoid 63, member 60 is moved to open position.

The operation of the device may be summarized as follows:

After the device has been connected to a source of alternating voltage and manual switch 15 has been closed, frankfurter F is placed in tray 47. Cover 11 is closed, impaling said frankfurter on electrodes 30. The closing of said cover closes switch 50, thereby completing the primary circuit since switch 59 is normally closed. Current passes through the primary circuit. Lamp 16 lights. Solenoid 41 is energized, and latch 38a, 45a is closed, retaining cover 11 in its closed position.

Current flows in the secondary circuit, cooking frankfurter F. The resistance of said frankfurter drops, and the voltage drop across resistor 53 increases. An increased direct current therefore flows through rheostat 69 and solenoid 63. Arm 68 of said rheostat is so pre-set that when frankfurter F is cooked to the desired degree, and its resistance therefore drops to a certain value, the current in solenoid 63 reaches the critical value, causing switch 59 to open.

When switch 59 opens, the primary circuit is broken. Lamp 16 goes off. Solenoid 41 is de-energized, latch 38a, 45a is opened, and cover 11 springs open. Switch 50 is thereby opened. The current in the secondary circuit ceases. Solenoid 63 is de-energized, and switch 59 closes again. Frankfurter F may then be removed from electrodes 30.

The above cycle of operations may then be repeated, except that occasionally tray 47 may be removed and cleaned, and electrodes 30 may be cleaned. It will be noted that relatively little grease or juice collects in tray 47, since no grease is used in cooking and the jacket of frankfurter F retains most of the juices therein.

It is apparent that the successful operation of the device depends on the decrease in resistance of frankfurters when cooked by the passage of current therethrough.

It has been found that said decrease in resistance is substantially uniform for all frankfurters of a given type and manufacture, and a given applied voltage. This decrease in resistance is, of course, accompanied by an increased voltage drop across resistor 53, which results in an increased current through solenoid 63. It is therefore possible to pre-set rheostat arm so that when frankfurter F reaches a certain resistance, corresponding to the desired degree of cooking, from raw to splitting, switch 59 will be opened and cooking will cease.

Cooking of frankfurters by this method results in uniform cooking. Since two or more electrode pins 32 are impaled in each end of frankfurter F, current is passed through a considerable portion of said frankfurter. In addition, there is a considerable steaming effect. The current heats the juices in the frankfurters and causes steam to be given off and permeate the same, the jacket preventing most of said steam from escaping.

The length of time that it takes for frankfurter F to be cooked to the desired extent depends upon the voltage developed across secondary S of transformer 52. It is preferred that said voltage be about 245–250 volts, at which voltage frankfurters of standard types can be cooked to any desired extent, up to splitting, in considerably less than one minute, and generally in 30–40 seconds. With a voltage as low as 110 volts, cooking generally takes 2–3 minutes. With a voltage as high as 550 volts, the frankfurter may be burned.

If it is desired, transformer 52 may be eliminated. In that case, frankfurter F and resistor 53 are connected in series with switch 15, switch 50 and switch 59. The rest of the circuit remains the same. However, in this case, direct current can also be used as the source of power. Then rectifier 66 can be eliminated, and resistor 53 connected in series with rheostat 69 and solenoid 63.

The device may be adapted to cook a plurality of frankfurters of one type and manufacture simultaneously. Cover 11 is then provided with a plurality of compartments, each containing a pair of electrodes 30, and tray 47 is provided with a plurality of corresponding compartments. One transformer 52 is provided for each said compartment in said cover 11. The primaries of said transformers are connected in parallel, and are further connected exactly as in Fig. 2. The secondaries of all but one of said transformers are respectively connected directly across the respective electrodes 30. The last secondary is connected exactly as in Fig. 2, so that only one frankfurter acts as a control, and the cooking of all frankfurters ceases when that one frankfurter is cooked to the desired extent.

Preferred embodiments of this invention have been disclosed, and preferred constructions of the parts have been described. Various possible changes and modifications have been indicated. Other changes and modifications can be made, without departing from the scope and spirit of the invention. The means for mounting electrodes 30 in cover 11 may be changed. Condenser 67 may be eliminated. The construction of latch 38a, 45a may be varied.

When the device is operated without a transformer, resistor 53 may be eliminated and replaced by rheostat 69, which is placed in series with frankfurter F, the source of current and the other components of the series circuit. Rectifier 66 is connected across said rheostat, and solenoid 63 across rectifier 66. Rheostat 69 then serves as a load resistor, as well as means for varying the current in solenoid 63. On direct current, rectifier 66 is eliminated, and solenoid 63 is connected in parallel with rheostat 69.

Rheostat 69 may be eliminated, and mechanical means for adjusting switch 59 may be provided, whereby the force necessary to open said switch may be varied.

It is possible to use electromagnets instead of solenoids, although it is preferable that member 63 be a solenoid. In the claims, the term "solenoid" will be understood to include the term "electromagnet."

If it is felt desirable not to have the device operate so nearly automatically, mechanical latch means or the equivalent, may be provided, instead of electrical latch means. Switch 50 may be eliminated, and switch 15 alone used to turn the device on and off.

Various other changes may be made.

What is claimed:

1. A device for cooking an article of food by passing an electric current therethrough, said article of food decreasing in electrical resistance as said current is passed therethrough, comprising a receptacle adapted to hold said article therein, a cover pivotally secured to said receptacle and spring biased to an open position, electrodes mounted in said cover, said electrodes being adapted to penetrate said article of food and form an electrical connection therewith when said cover is closed, a transformer comprising a primary winding and a secondary winding, a micro-switch, means closing said micro-switch when said cover is closed, a relay switch which is normally closed, said micro-switch, relay switch and primary winding being connected in series with a source of alternating current to form a primary circuit, a locking solenoid connected in parallel with said primary winding, latch members respectively mounted in said receptacle and in said cover, means associated with said locking solenoid and said latch member in said receptacle and holding said latch members in locked position when said cover is closed and said primary circuit is completed, said latch members being unlocked when said primary circuit is opened, a load resistance, said load resistance, said article of food and said secondary winding being connected in series to form a secondary circuit when said article of food is impaled on said electrodes, current rectifying means connected in parallel with said load resistance, a variable resistor, a relay solenoid, said variable resistor and said relay solenoid being connected in series with the output of said rectifying means to form a control circuit, manual adjusting means for varying the value of said variable resistance in said control circuit, circuit-breaking means associated with said relay switch and said relay solenoid and adapted to exert an opening force on said relay switch when said relay solenoid is energized, said variable resistance being so adjustable by said manual adjusting means that said circuit breaking means is actuated to open said relay switch when the resistance of said article of food drops to a desired value.

2. A device for cooking a frankfurter or the like by passing an electric current therethrough, comprising a receptacle adapted to hold said frankfurter therein, a cover pivotally secured to said receptacle, co-operating means including spaced electrodes carried by said cover and said receptacle for impaling the respective ends of said frankfurter on said electrodes by closure of said cover, a transformer having a primary winding and a secondary winding, a primary switch which is normally open and which is closed by the closing of said cover, a relay switch which is normally closed, said primary switch, relay switch and primary winding being connected in series with a source of alternating current to form a primary circuit, a locking solenoid connected in parallel with said primary winding, latch members respectively mounted in said receptacle and in said cover, means associated with said locking solenoid which hold said latch members in locked position when said cover is closed and said primary circuit is completed, said latch members being unlocked when said primary circuit is opened, a load impedance, said load impedance, said frankfurter and said secondary winding being connected in series to form a secondary circuit when said frankfurter is impaled on said electrodes, current rectifying means connected in parallel with said load impedance, a relay solenoid connected to the output of said current rectifying means, circuit breaking means associated with said relay switch and said relay solenoid and adapted to exert an opening force on said relay switch when said relay solenoid is sufficiently energized as the result of the drop of resistance of said frankfurter by the passage of current therethrough.

3. A device for cooking a frankfurter or the like, comprising a source of electric current, a load impedance, means for connecting said load impedance and said frankfurter in series with said source of current so as to cook said frankfurter by the heat generated therein by the passage of current therethrough, and control means for terminating said passage of current through said frankfurter, said control means comprising said load impedance, a control switch in the supply circuit for said source of current, said control switch being normally closed, relay means connected in a circuit with said load impedance, and switch-opening means actuatable by said relay means to open said control switch when said relay means is sufficiently energized as the result of the drop of resistance of said frankfurter by the passage of current therethrough.

4. A device for cooking a frankfurter or the like, comprising a source of electric current, a load impedance, means for connecting said load impedance and said frankfurter in series with said source of current so as to cook said frankfurter by the heat generated therein by the passage of current therethrough, and control means for terminating said passage of current through said frankfurter, said control means comprising said load resistance, current rectifying means connected in parallel with said load resistance, relay means connected in circuit with the output of said current rectifying means, a control switch in the supply circuit for said source of current, and switch-opening means actuatable by said relay means to open said control switch when said relay means is sufficiently energized as the result of the drop of resistance of said frankfurter by the passage of current therethrough.

5. A device for cooking a frankfurter or the like by passing an electric current therethrough, comprising a transformer which has a primary winding and a secondary winding, a control switch, a source of alternating current, said control switch and said primary winding being connected in series with said source of alternating current, a load resistance, means for connecting said frankfurter and said load resistance being in series with said secondary winding so as to cook said frankfurter by the heat generated therein by the passage of current therethrough, current rectifying means connected in parallel with said load resistance, relay means connected in circuit with the output of said current rectifying means, and switch-opening means actuatable by said relay means to open said control switch when said relay means is sufficiently energized as the result of the drop of resistance of said frankfurter by the passage of current therethrough.

6. A device for cooking a frankfurter or the like by passing an electric current therethrough, comprising a receptacle adapted to hold said frankfurter therein, a cover pivotally secured to said receptacle, co-operating means including spaced electrodes carried by said cover and said receptacle for impaling the respective ends of said frankfurter on said electrodes by closure of said cover, a transformer which has a primary winding and a secondary winding, a primary switch which is normally open and which is closed by the closing of said cover, a control switch, a source of alternating current, said primary switch, said control switch and said primary winding being connected in series with said source of alternating current, a load resistance, said frankfurter and said load resistance being connected in series with said secondary winding when said frankfurter is impaled on said electrodes, current rectifying means connected in parallel with said load resistance, relay means connected in circuit with the output of said current rectifying means, and switch-opening means actuatable by said relay means to open said control switch when said relay means is sufficiently energized as the result of the drop of resistance of said frankfurter by the passage of current therethrough.

7. A device in accordance with claim 6, said device also comprising a receptacle latch member and a cover latch member, a locking solenoid connected in parallel with said primary winding, and means associated with said locking solenoid which are adapted to hold said latch members in locked position when said cover is closed and said primary circuit is completed, said latch members being unlocked when said primary circuit is opened.

8. A device for cooking a frankfurter or the like by passing an electric circuit therethrough, comprising a receptacle adapted to hold said frankfurter therein, a cover pivotally secured to said receptacle, co-operating means including spaced electrodes carried by said cover and said receptacle for impaling the respective ends of said frankfurter on said electrodes by closure of said cover, a transformer which has a primary winding and a secondary winding, a control switch, a source of alternating current, said control switch and said primary winding being connected in series with said source of alternating current, a load resistance, said frankfurter and said load resistance being connected in series with said secondary winding when said frankfurter is impaled on said electrodes, current rectifying means connected in parallel with said load resistance, relay means connected in circuit with the output of said current rectifying means, and switch-opening means actuatable by said relay means to open said control switch when said relay means is sufficiently energized as the result of the drop of resistance of said frankfurter by the passage of current therethrough.

IRWIN SPEISS.
LEONARD B. SIMON.

References Cited in the file of this patent
UNITED STATES PATENTS

| Number | Name | Date |
| --- | --- | --- |
| 1,913,580 | Altschuler et al. | June 13, 1933 |
| 1,923,889 | Sauter | Aug. 22, 1933 |
| 2,042,595 | Graham | June 2, 1936 |
| 2,269,178 | Breneman | Jan. 6, 1942 |
| 2,284,863 | Gulliksen | June 2, 1942 |
| 2,314,956 | Slayter et al. | Mar. 30, 1943 |
| 2,440,108 | Maxwell | Apr. 20, 1948 |
| 2,455,379 | McLennan | Dec. 7, 1948 |
| 2,474,390 | Aff | June 28, 1949 |
| 2,479,319 | Crowley et al. | Aug. 16, 1949 |
| 2,522,753 | Drobisch | Sept. 19, 1950 |